C. W. A. KOELKEBECK.
UNIVERSAL ROLLING MILL.
APPLICATION FILED AUG. 26, 1919.
1,387,650.
Patented Aug. 16, 1921.
3 SHEETS—SHEET 2.
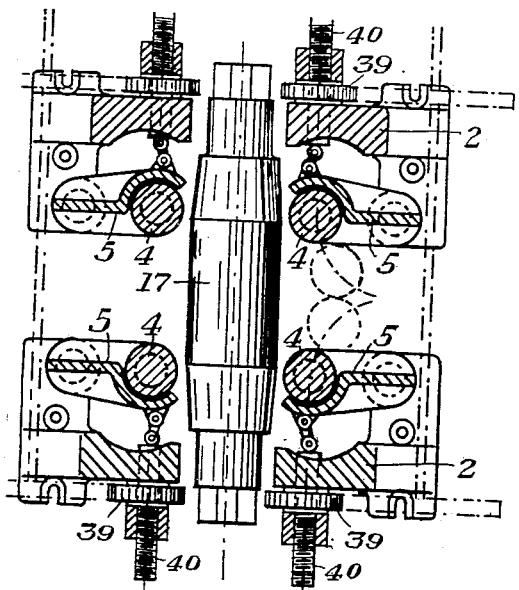
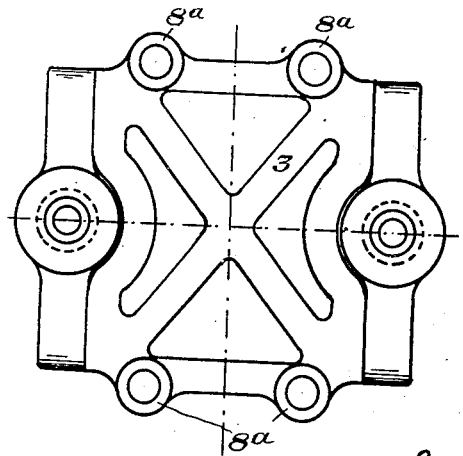
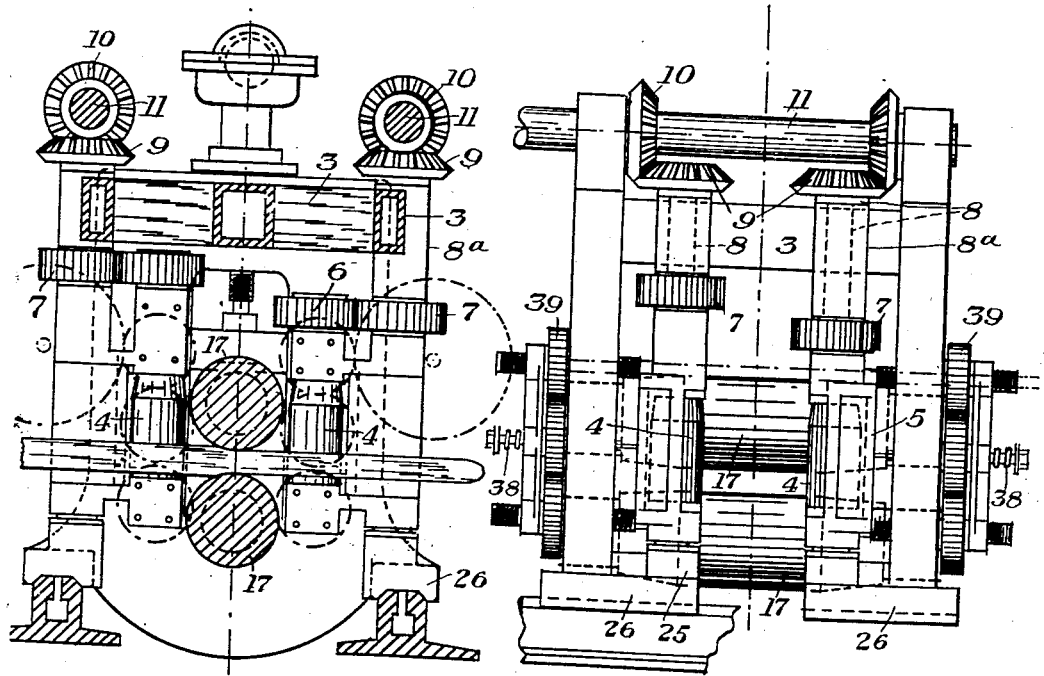

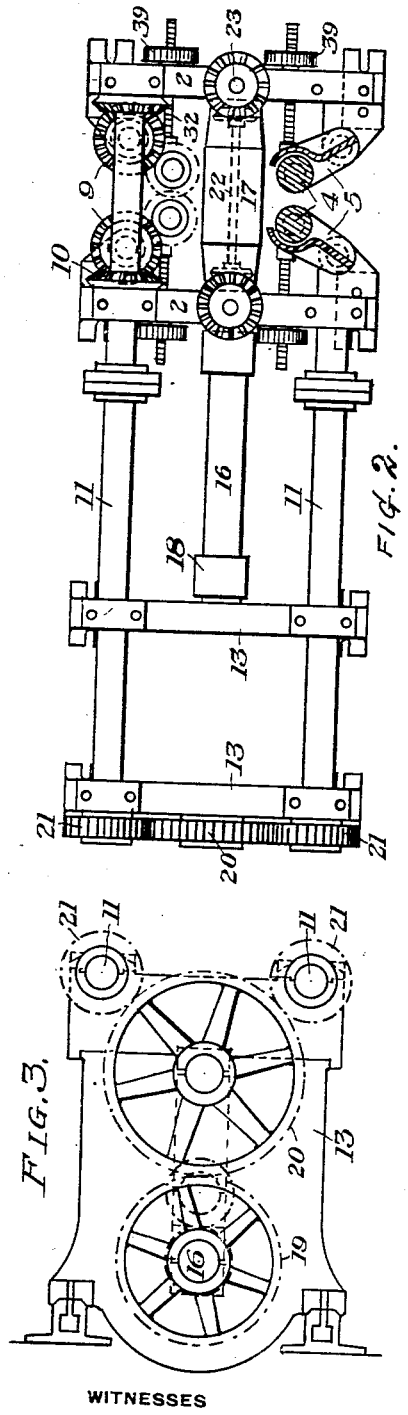
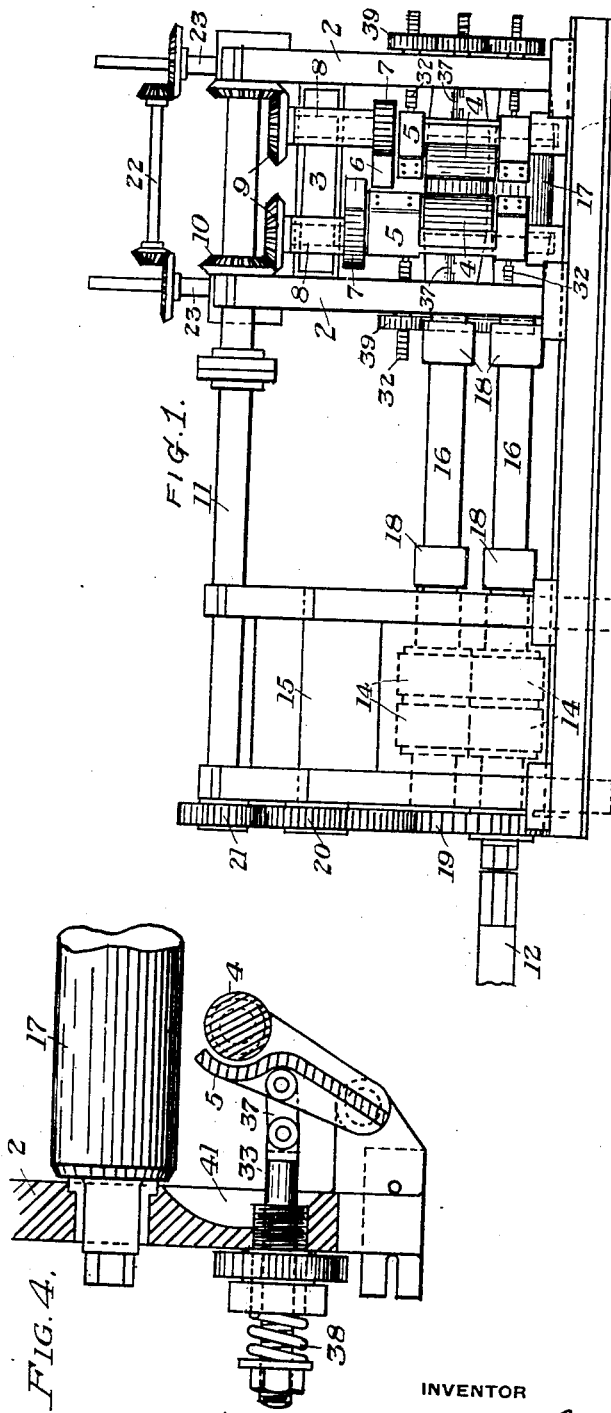

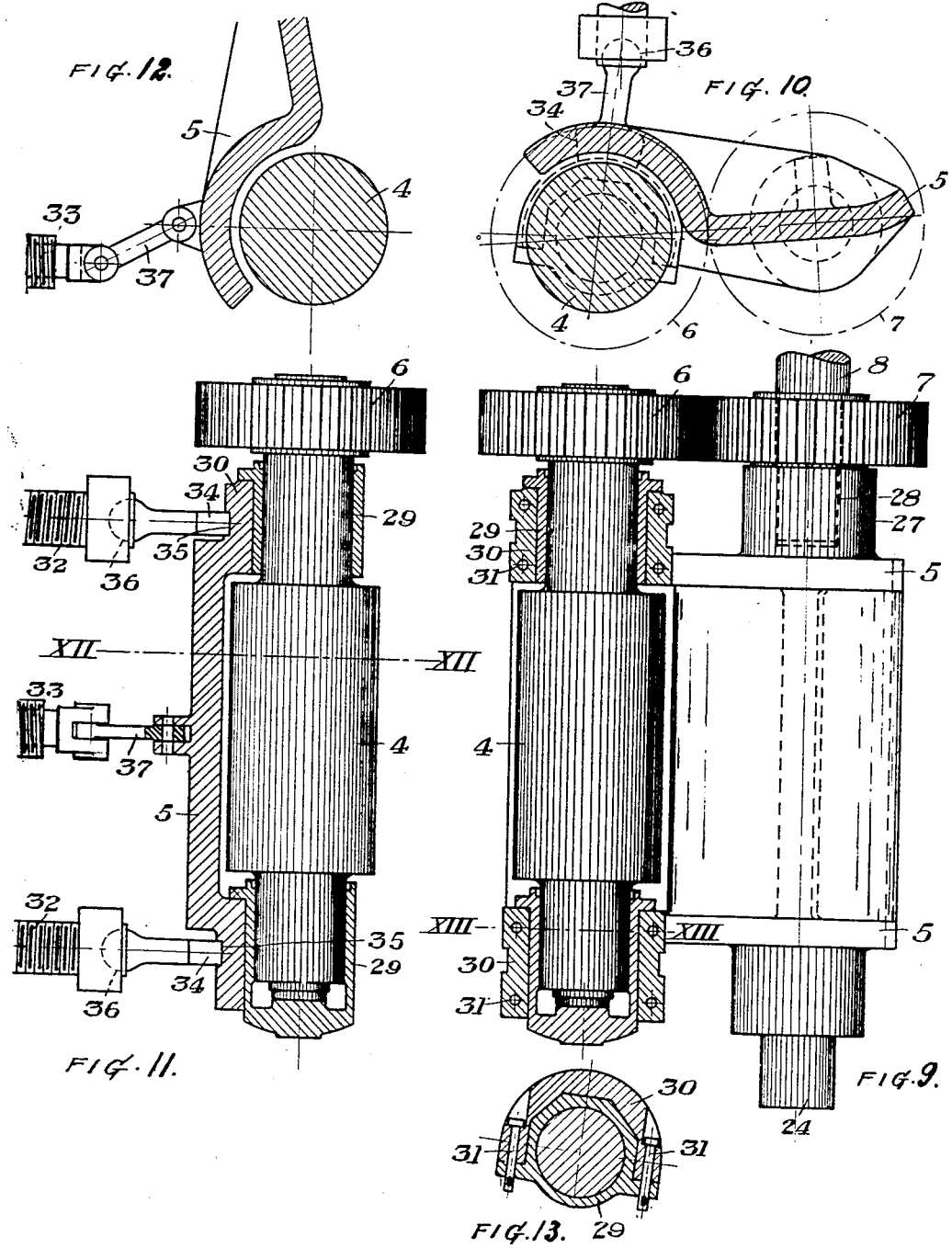

UNITED STATES PATENT OFFICE.

CARL W. A. KOELKEBECK, OF ALLIANCE, OHIO.

UNIVERSAL ROLLING-MILL.

1,387,650.

Specification of Letters Patent.  Patented Aug. 16, 1921.

Application filed August 26, 1919. Serial No. 319,949.

*To all whom it may concern:*

Be it known that I, CARL W. A. KOELKEBECK, a citizen of the United States, residing at Alliance, in the county of Stark and State of Ohio, have invented a new and useful Improvement in Universal Rolling-Mills, of which the following is a full, clear, and exact description, reference being had to the accompanying drawings, forming part of this specification, in which—

Figure 1 is a front elevation of a portion of a universal mill embodying my invention;

Fig. 2 is a plan view of the same;

Fig. 3 is an end view of the pinion housing;

Fig. 4 is a sectional plan view of certain of the parts;

Fig. 5 is a transverse vertical section of the mill;

Fig. 6 is a sectional plan view;

Fig. 7 is a front elevation of a portion of the mill;

Fig. 8 is a plan view of the housing separator;

Fig. 9 is a sectional elevation showing one of the vertical rolls and its mounting;

Fig. 10 is a transverse section of the same;

Fig. 11 is a sectional elevation showing one of the vertical rolls;

Fig. 12 is a horizontal section on the line XII—XII of Fig. 11;

Fig. 13 is a detail sectional view on the line XIII—XIII of Fig. 10.

My invention has relation to universal rolling mills, and has for its main objects the provision of a mill of this character in which the length of the horizontal rolls may be greatly shortened; in which the vertical rolls may be driven by an improved arrangement of gearing without the use of beveled gears keyed to said rolls; in which the vertical rolls may be brought closer together than has heretofore been possible, and in which said rolls may be so mounted that they may be quickly removed and replaced.

The nature of my invention will be best understood by reference to the accompanying drawings, in which I have shown the preferred embodiment thereof and which will now be described, it being premised, however, that various changes can be made in the details of construction and arrangement and combination of the parts, without departing from the spirit and scope of my invention as defined in the appended claims.

In these drawings, the numeral 2 designates the roll housings; 3 a separator between the housings; 4 the vertical rolls; and 5 the supports for said rolls. These supports are arranged to swing toward and away from each other in the manner best illustrated in Fig. 6, and which will be hereinafter more fully described. 6 designates spur gears keyed to the vertical rolls, and 7 are the driving gears which mesh with the gears 6 and which are carried by the vertical shafts 8. Each of these vertical shafts has a beveled gear 9, at its upper end, which is driven by engagement with a beveled wheel 10 on the driving shaft 11. 12 designates the leading spindle; 13 the main pinion housings; 14 the main driving pinions; 15 the separator for the pinion housings; 16 the main spindles driving the horizontal rolls 17; and 18 the usual coupling boxes. 19 is a driving gear on the lower main pinion meshing with an idler 20, which drives pinions 21, keyed to the shafts 11. 22 is a shaft which is geared to the screw-down devices 23, for the purpose of adjusting the horizontal rolls and which may be driven in any usual or suitable manner, not shown.

Each of the vertical rolls 4 is mounted in one of the swinging supports 5, before referred to. Each of these supports is provided with a lower trunnion 24, best shown in Fig. 9, which is provided with a suitable step bearing at 25. It also has an upper trunnion 27, which is formed with a socket 28, to receive the lower end of one of the vertical drive shafts 8. The supports 5 swing on these trunnions in the manner of a door swinging on its hinges. By reference to Figs. 2 and 6, the arrangement and mounting of the vertical rolls will be made apparent. The vertical rolls are placed close up to the horizontal rolls, while the swinging supports 5 are placed outward of the same, thus permitting the vertical rolls to swing close to the center line of the mill to permit edging narrow pieces. In Fig. 2, the vertical rolls are shown close together and it will be noted that the supports 5 subtend quite an angle from their fulcrums. In Fig. 6, the vertical rolls are shown nearly their maximum distance apart, and it will be noted that only a small outward movement would be required to bring the supports in touch with the inner faces of the mill housings.

The bearings 29 for the vertical rolls are held in seats 30 in the supports 5, said seats having open sides, in the manner best shown in Fig. 13, and the bearings being secured therein by means of the key bolts 31. By merely driving the keys from the eight securing bolts, the bearings, together with the rolls, may be quickly removed from the mill. In doing this, the lifting chain of the crane employed for lifting the vertical rolls may be slung around the rim of the gear 6, and this gear will readily roll out of mesh with its driving gear 7.

The swinging supports are held in the desired adjustment by adjusting screws 32 and 33. These screws are seated in the roll housings, and the upper and lower screws 32 are preferably provided at their inner ends with shoes 34, which bear against the seats 35, (see Fig. 11) on the support, and have a ball-joint connection at 36 with said screws. The middle screw 33 of this set is connected with the support by a link 37, and this screw is also provided with a tension spring 38 (see Fig. 4). The upper and lower screws are always in compression when the mill is in operation, and are therefore of relatively massive design; while the intermediate screw is in tension when the rolls are being adjusted and is idle when the mill is in operation. The forward movement of the upper and lower screws is equivalent to the retrograde movement of the central screw. In other words, the central screw must give as much leeway as the upper and lower screws will take. The tension spring 38 is merely for the purpose of keeping the entire system in tension and to take up the slack. The threads on the central screw will usually be of opposite hand to that of the other screws. The screws may be adjusted in any suitable manner by means of gears, such as shown at 39 in Fig. 7, and any suitable motive device (not shown) may be used for actuating these gears. I may, however, use simple adjusting screws, such as shown at 40 in Fig. 6, for controlling the positions of the vertical rolls on their supports.

It will be noted that the vertical shafts 8 are mounted in long bearings 8ᵃ on the separator 3. As will appear from the foregoing, the driving motion for the vertical rolls is taken in the first instance to these shafts through the beveled gear connections with the driving shafts 11. These vertical shafts, in turn, transmit motion to the spur gears 6, through the gears 7, the lower ends of said shaft 8 forming the upper bearings for the swinging supports 5. In assembling the parts, the supports may be positioned above the bearings for their lower trunnions 24, and in line therewith to lower said trunnions into said bearings.

The space between the support 5 and the adjacent bearing 8ᵃ is slightly greater than the length of the lower trunnion, and the gear 7 may be inserted in this space. The vertical shaft 8 with its beveled driving gear can then be lowered into the housing and into the spur gear 7. In order not to drive this gear on a feather or key, I prefer to make said shaft square where it enters the gear. After the parts are in place, as above described, all that is necessary is to insert the driving shafts 11 with their beveled gears, and the drive for the vertical rolls is completed.

An objection to universal mills commonly in use is that the horizontal rolls are unduly long. Looking at Fig. 2, it will be noted that these rolls have conical end portions beyond the straight working portions. These conical end portions are solely for the purpose of making sufficient room for the vertical rolls. Thus, the horizontal distance between the roll housings cannot be less than the width of the maximum size of metal to be rolled, plus the combined diameters of the two vertical rolls. With my improved mounting, however, this distance may be greatly shortened by forming the concavities 41 in the inner faces of the roll housings, as indicated in Fig. 4. In this manner, space is provided to receive a part of the free swinging ends of the supports 5 and of the vertical rolls. By this construction, the conical portions of the horizontal rolls may be greatly shortened; thus shortening the free length of such rolls and enabling the housings to be brought much closer together. In consideration of the fact that the rolls have to be renewed from time to time; that they are frequently shipped long distances from the place of manufacture to the mill, etc., the saving in cost of manufacture and in handling the short rolls is a very material item.

I claim:

1. In a universal mill, the combination of roll housings and horizontal rolls, a set of vertical rolls, and horizontally swinging supports in which the vertical rolls are journaled, substantially as described.

2. In a universal mill, the combination of roll housings, horizontal rolls mounted therein, vertical rolls, horizontally swinging supports in which the vertical rolls are mounted, and spur gearing for driving said vertical rolls, substantially as described.

3. In a universal mill, the combination of roll housings, horizontal rolls mounted therein, vertical rolls, horizontally swinging supports in which the vertical rolls are mounted, a driving shaft, and vertical shafts interposed between the driving shafts and the shafts of the vertical rolls and geared to the latter, substantially as described.

4. In a universal mill, the combination of roll housings, horizontal rolls mounted therein, horizontally swinging supports, vertical rolls journaled in said supports, main driving shafts, vertical driving shafts interposed between the main driving shafts and the vertical rolls and geared to the latter, and bearings for said vertical shafts, said bearings being located between the driving shaft and the vertical rolls, substantially as described.

5. In a universal mill, the combination of roll housings, horizontal rolls mounted therein, one or more sets of vertical rolls, swinging supports in which the vertical rolls are journaled, and means whereby the said supports may be swung simultaneously, substantially as described.

6. In a universal mill, the combination of roll housings, horizontal rolls mounted therein, vertical rolls, horizontally swinging supports in which the vertical rolls are mounted, said supports having trunnion bearings at their lower ends, vertical driving shafts whose lower ends form upper bearings for said supports, and spur gears on said vertical shafts meshing with the driving gears of the vertical rolls, substantially as described.

7. In a universal mill, the combination of roll housings, horizontal rolls mounted therein, vertical rolls, horizontally swinging supports in which the vertical rolls are mounted, said supports having trunnion bearings at their lower ends, vertical driving shafts whose lower ends form upper bearings for said supports, and spur gears on said vertical shafts meshing with the driving gears of the vertical rolls, said supports having open seats for the bearings of the vertical rolls, substantially as described.

In testimony whereof I have hereunto set my hand.

CARL W. A. KOELKEBECK.